United States Patent

[11] 3,577,907

| [72] | Inventor | Raymond W. Kunz |
| | | Monroe, Conn. |
| [21] | Appl. No. | 823,688 |
| [22] | Filed | May 12, 1969 |
| [45] | Patented | May 11, 1971 |
| [73] | Assignee | General Electric Company |

[54] ELECTRIC TOASTER CONTROL
7 Claims, 6 Drawing Figs.

[52] U.S. Cl. .................................................. 99/329
[51] Int. Cl. ............................................ A47j 27/00,
A47j 27/62
[50] Field of Search ................................. 161/16;
337/1, 37, 57, 70, 81, 82, 84, 88, 94, 334, 341,
347, 357, 360, 361, 374, 375; 99/327, 329

[56] References Cited
UNITED STATES PATENTS

| 3,032,424 | 5/1962 | Visos | 99/329 |
| 2,597,805 | 5/1952 | Kitto | 99/329 |
| 2,574,993 | 11/1951 | White | 337/341X |
| 2,339,183 | 1/1944 | Meyers | 99/327 |
| 2,236,394 | 3/1941 | Biebel | 161/16 |

FOREIGN PATENTS

| 846,484 | 8/1960 | Great Britain | 337/341 |

Primary Examiner—Bernard A. Gilheany
Assistant Examiner—Dewitt M. Morgan
Attorneys—Lawrence R. Kempton, Leonard J. Platt, John F. Cullen, Frank L. Neuhauser, Oscar B. Waddell and Melvin M. Goldenberg ABSTRACT: An electric toaster with a timer for controlling the toasting cycle wherein a primary member is provided for setting a toasting time interval, and a secondary member is provided for temporarily changing the toasting time interval without changing the position of the primary setting member.

Patented May 11, 1971
3,577,907
2 Sheets-Sheet 1
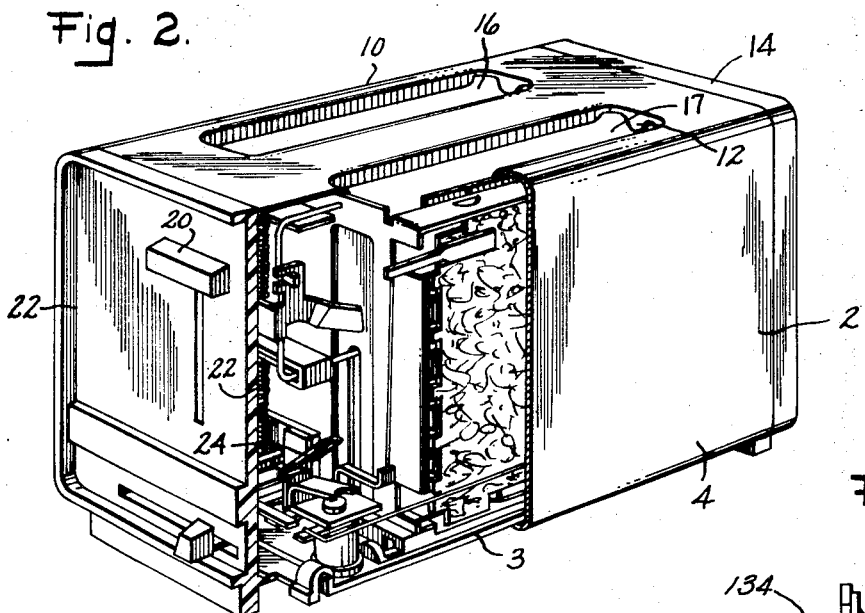
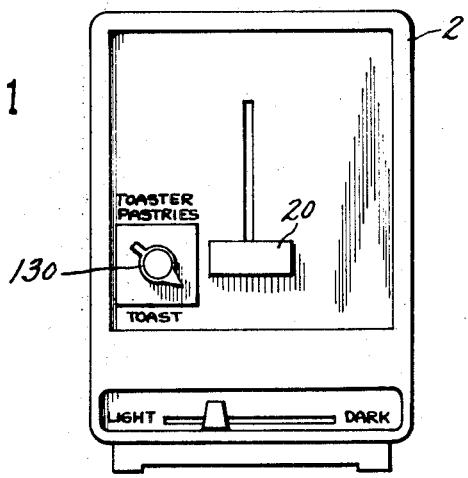
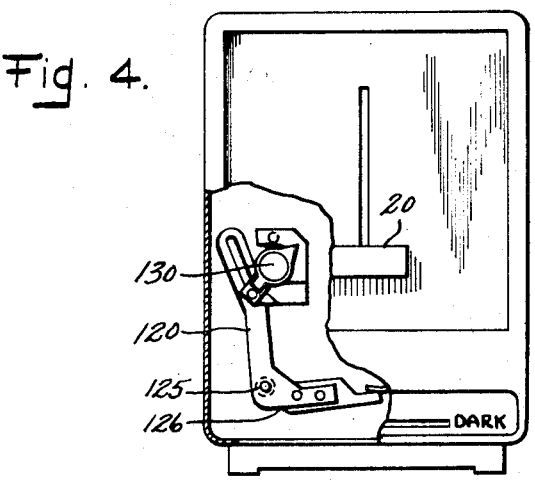
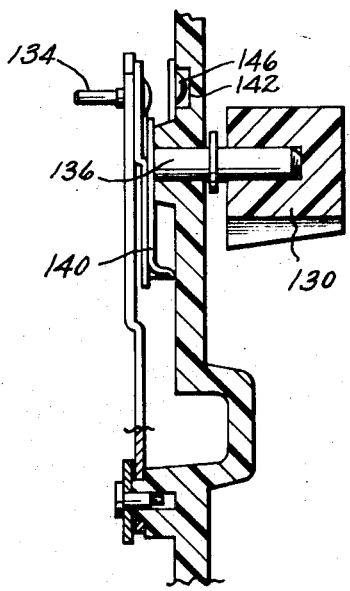
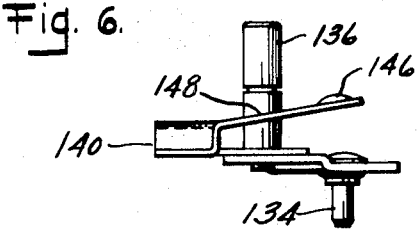
Inventor:
Raymond W. Kunz
by [signature]
Attorney Patented May 11, 1971

Inventor:
Raymond W. Kunz
by *Jerrard J. Platt*
Attorney

ELECTRIC TOASTER CONTROL

BACKGROUND OF THE INVENTION

This invention relates to an electric toaster wherein a timer is provided for controlling the duration of the toasting cycle, and more particularly, to an arrangement for temporarily setting the timer for toasting or cooking pastry-type convenience foods without disturbing the normal setting of the timer for toasting bread.

As is well known in the electric toaster art, electric toasters have used timers for controlling the toasting interval. With such a mechanism, when a slice of bread or other food has been placed in the toaster and the food is lowered, a switch closes an electric circuit to energize an electric heater which is provided for toasting the bread, and at the same time, or substantially the same time, an interval timer is energized to control the duration of the toasting time. At the end of the toasting time interval, the timer opens the electric heater circuit, deenergizing the electric heating element which has been toasting the slice of bread or other food. At the same time, a mechanism is usually energized for lifting the toast so that it may be removed from the toaster.

In most prior art constructions, a lever or knob is provided at the side of the toaster for setting the toasting time interval. With this arrangement, the timer is set to achieve just the right degree of lightness or darkness of the toast as determined by individual preference. This is usually accomplished by trial and error and once having achieved the appropriate "Light—Dark" setting, most individuals prefer to leave the timer in the appropriate "Light—Dark" setting. Accordingly, should an individual desire to cook or toast pastry-type convenience foods, it would be particularly desirable to be able to set the toaster for a time interval for cooking such convenience foods without disturbing the normal setting of the timer for toasting a slice of bread.

Accordingly, it is a particular object of my invention to provide an improved secondary control for a toaster timer which may be set to toast or cook pastry-type convenience foods without disturbing the primary setting of the toaster timer for toasting a slice of bread.

In a copending allowed application of P. V. Snyder, Ser. No. 813,141 filed Apr. 3, 1969, and assigned to the same assignee as the instant invention, there is disclosed a bimetal timer for timing the toasting period. As shown in the copending application, a manually movable control is provided at the side of the toaster for moving a cam to set the toasting time interval of the timer. Movement of the cam adjusts the position of a plate member of the timer with respect to the bimetal to thereby set the toasting time interval. My invention will be described in combination with the bimetal timer disclosed in the aforesaid application; however, it will be appreciated that it can be used in combination with other toaster timers.

Thus, it is also an object of the invention to provide an improved secondary control which may be uniquely and easily combined with a bimetal timer of the type disclosed in the above-mentioned patent application, and other toaster timers.

SUMMARY OF THE INVENTION

In accordance with one of the aspects of this invention, an electric toaster includes a timer or similar mechanism for controlling the toasting cycle, and on the timer itself, a setting member is provided for setting the duration of the toasting time interval. A primary manual setting member is movable to any one of a plurality of positions to vary the setting of the timer member to vary the toasting time interval. The primary setting member is normally in engagement with the timer member and, thus, the timer setting member is moved to any one of a plurality of positions corresponding to the positions set by the primary setting member. A selector member is provided for overriding the setting of the primary setting member for toasting or cooking pastry-type convenience foods. The selector member is manually movable into engagement with the timer setting member for changing the time interval setting of the timer member without changing the position of the primary setting member. The selector lever is spaced from the primary setting member so that it moves the timer member out of engagement with the primary setting member when it is moved into engagement with and overrides the primary setting member.

With this construction, the selector lever may be manually moved at any time to set the toaster for toasting or cooking pastry-type convenience foods without disturbing the normal position of the primary setting member. Thus, after the convenience pastry-type foods have been cooked and the selector lever is moved out of engagement with the timer setting member, slices of bread may be toasted at the individual "Light—Dark" preference setting which had been previously set by movement of the primary manual setting member. This is accomplished by the use of a minimum number of parts which are readily combined with a toaster timer. Thus, an exceedingly simple, unique toaster timer control has been achieved.

BRIEF DESCRIPTION OF THE DRAWINGS

Other objects and attendant advantages of this invention will be apparent from the following description taken in connection with the accompanying drawing in which:

FIG. 1 is a side elevational view of an electric toaster construction embodying my improved timer control;

FIG. 2 is a perspective view of the electric toaster shown in FIG. 1 partly broken away to show details of construction;

FIG. 4 is a side elevational view of the electric toaster shown in FIG. 1 partly broken away to show the selector lever in a position for toasting or cooking convenience foods, that is, the selector lever is in engagement with the timer member and the primary setting member is out of engagement with the timer member;

FIG. 5 is a cross-sectional view of the electric toaster selector lever shown in FIG. 4; and FIG. 6 is a top plan view of the selector lever actuator.

DESCRIPTION OF THE PREFERRED EMBODIMENT

Figure 3:
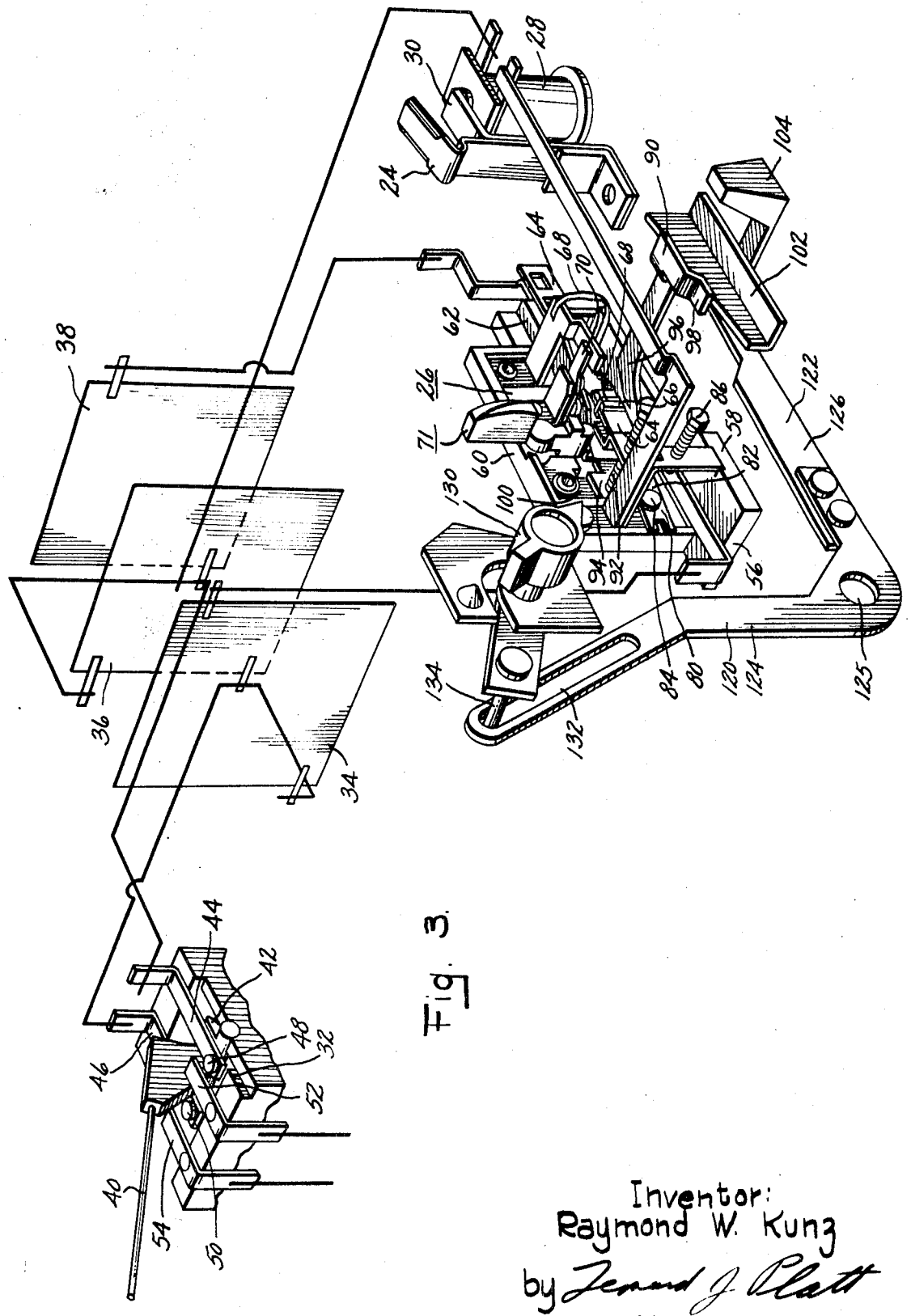
FIG. 3 is a schematic perspective view of the electric toaster illustrated in FIG. 1 showing the positions of the parts at the termination of a toasting cycle, that is, after the toaster carriage has been returned to its upper position illustrated in FIG. 2 and the electric resistance wire heater for toasting the bread or other food has been deenergized. In this position, the primary setting member is in engagement with the timer member for setting the toasting time interval, and the selector lever for setting the timer for toasting convenience foods is out of engagement with the timer member.

Referring now to the drawing and first particularly to FIGS. 1 and 2, there is shown an electric toaster 2 which includes an inner supporting structure 3 and an outer cover 4. Bread-receiving slots 10 and 12 are formed in a top wall 14 of the outer casing, and toasting chambers 16 and 17 are generally defined below the slots 10 and 12, respectively. A bread carriage 20 is movable vertically in the toasting chambers 16 and 17, as is conventional in popup-style toasters.

When it is desired to toast a slice of bread or other food, the toaster carriage 20 is manually depressed from the position illustrated in FIG. 2 to the position illustrated in FIG. 1, thereby lowering the carriage 20 against the force of a spring 22; and when the carriage reaches the position illustrated in FIG. 1, a latch mechanism 24 holds the carriage in its lower toasting position.

In the embodiment illustrated, a bimetal toaster timer 26 energizes a solenoid 28 at the end of the toasting cycle to release the latch 24 to thereby permit the toaster carriage 20 to be moved upwardly to its bread removal position illustrated in FIG. 2. As shown in FIG. 3, an L-shaped piece of sheet metal 30 is welded to the latch 24, and at the end of the toasting cycle when the solenoid 28 is energized, the metal 30 is pulled down on top of the solenoid 28 to move the latch thereby permitting the carriage 20 to move to its upper position under the force of spring 22.

The electric toaster includes a main switch 32 which is provided for energizing the toasting heating elements 34, 36 and 38 shown diagrammatically in FIG. 3. With this construction, upon downward movement of the toaster carriage 20, the toaster carriage will move into contact with wire actuating lever 40 to cause cam member 42 to lift switchblades 44 and 46 until contacts 48 and 50 abut contacts 52 and 54 to thereby close the main switch 32.

When the main toaster heater contacts 48, 52 and 50, 54 are in their closed positions to start toasting a slice of bread, the bimetal timer 26 is also energized to control the duration of the toasting or cooking time interval. As shown in FIG. 3, the bimetal timer supporting structure includes a generally L-shaped piece of phenolic 56 or other suitable insulating material. As illustrated, the phenolic support consists of a generally flat bottom wall portion 58 and a generally vertical wall portion 60. The vertical wall portion 60 includes an outwardly extending projection 62 for mounting a bimetal 64. A sheet of insulating material 66 is wrapped around the bimetal 64 and a heater wire 68 is wrapped around the insulating material in order to heat the bimetal 64 at the start of the toasting cycle. A switch 70 controls energization of the bimetal heater and it is in a closed position when the toaster carriage 20 is lowered to close the main switch 48, 52, 50, 54. The details of this switch 70 do not form a part of this invention and are described and illustrated in greater detail in the above-mentioned allowed copending application, Ser. No. 813,141 of Paul V. Snyder assigned to the same assignee as the present invention.

As the bimetal 64 is heated by the bimetal heater 68, the bimetal itself bows away from the vertical wall 60 of the phenolic insulating plate, i.e., the central portion of the bimetal tends to move outwardly and the end portions of the bimetal are forced inwardly; and as described in greater detail in the aforementioned application, after the bimetal has been heated a predetermined amount, it opens switch 70 to deenergize the bimetal heater 68 to permit the bimetal 64 to cool down. As the bimetal cools down, it tends to straighten out and the end portions which had been urged toward the vertical wall 60 now move away from the vertical wall, particularly the free end portion 80 and a switchblade 82 which is attached thereto moves away from the vertical wall member 60. Upon continued movement in this direction a switch contact 84 will abut the end of screw 86 to close the solenoid switch 84—86. When the solenoid 28 is energized, the metal leg 30 is pulled down on top of the solenoid to move the latch 24 to release the carriage 20 thereby permitting the carriage 20 to move upwardly under the force of spring 22.

A readily formed lever construction is provided for setting the toasting time interval. This construction includes a timer cam follower plate 90 and an adjusting screw 92. These parts determine the pivot point of the left end of the bimetal 64 and thereby cooperate to set the time when the switch 70 deenergizes the bimetal heater 68 to thereby determine the time interval of the heat-up/cool-down bimetal 64 and the toasting cycle. A manufacturing adjustment in the length of this cycle is initially made by adjusting the position of screw 92 with respect to followup plate 90. It can be seen that the screw 92 is merely rotated within the threaded portion of blade 82 to initially adjust the relative position of the end of the screw 92 to the surface of the cam follower plate 90.

As shown more particularly in FIG. 3, the timer cam follower plate 90 is generally L-shaped. It includes a generally vertical portion 94 which extends downwardly from the top portion of the vertical wall 60 to a position below the bimetal 64, a portion 96 which extends outwardly from the generally vertical wall 60 of the phenolic support, and a generally horizontal cam contacting portion 98 which is connected to one of the ends of the U-shaped portion and is arranged generally perpendicular to the U-shaped portion and generally parallel to the bimetal 64. As shown more particularly in FIG. 3, the top end of the generally vertical portion 94 is fixed to a leaf spring bracket 100 which is riveted or otherwise secured to the vertical wall 60 of the phenolic support. With this construction, the cam follower plate 90, and more particularly, the generally horizontal cam contacting portion 98 is spring-urged downwardly into engagement with a slide cam member 102.

As shown more particularly in FIG. 3, the slide cam member 102 is provided for manually moving the outwardly extending end portion 98 of the timer setting member upwardly to move the vertical arm 94 of the timer cam follower plate toward the adjusting screw 92, thereby decreasing the toasting time interval. Movement of the cam 102 in the opposite direction allows the cam follower vertical wall 94 to move toward the vertical wall 60 of the phenolic control body and away from adjusting screw 92 thereby increasing the toasting time interval. A suitable manual control knob 104 may be attached to the slide cam 102 to enable an operator to slide the cam 102 to control the position of the cam follower vertical wall 94 with respect to adjusting screw 92 to thereby control the length of the toasting cycle. It can be appreciated that when the manual slide cam setting member 102 is moved to the left as shown in FIG. 3, the length of the toasting cycle is decreased, and when the primary setting cam 102 is moved to the right as viewed in FIG. 3, the timer member plate 94 is moved away from adjusting screw 92 and the length of the toasting cycle is increased.

The structure so far described is illustrated and described in greater detail in the above-mentioned allowed copending application, Ser. No. 813,141 of Paul V. Snyder assigned to the assignee as the present invention.

PASTRY-TYPE CONVENIENCE FOOD CONTROL

According to my invention, there is uniquely combined with the aforedescribed electric toaster control an improved control arrangement for temporarily setting the timer for toasting or cooking pastry-type convenience foods without disturbing the normal setting of the timer for toasting bread. This unique mechanism temporarily overrides the primary manual setting cam member 102, 104 and temporarily lifts the cam follower plate 98 above cam 102 to move vertical wall 94 closer to screw 92 thereby decreasing the toasting or pastry cooking time interval. It can be appreciated that the pastry-type convenience foods require a shorter toasting time interval and, therefore, my unique secondary control is particularly designed to instantaneously shorten the toasting time interval setting of the timer setting member 90.

An extremely reliable and easily manufactured arrangement is provided for lifting the timer setting member 90 to instantaneously shorten the toasting time interval. As shown, a selector lever 120 is provided for lifting the cam follower plate 98 which sets the toasting time interval of the bimetal timer. The selector lever 120 is generally L-shaped and includes a lower generally horizontal arm 122 and a generally vertical arm 124. A suitable piece of insulation 126 is fixed to the lower horizontal arm 122 for abutting and lifting cam follower plate 98.

As shown more particularly in FIGS. 3 and 4, the selector lever 120 may be conveniently pivoted at 125 on a bracket (not shown) which extends upwardly from the base of the toaster. The selector lever is uniquely positioned with respect to the cam follower timer setting plate 98 and manual setting cam 102 so that it may readily lift the timer setting plate 98 and it is conveniently spaced from the cam 102 so that it can lift the timer member 98 to change the toasting time setting of the timer without changing the position of the primary setting cam 102. A rotatable knob 130 is provided for moving the selector lever 120 to its "Toaster Pastries" position at which time it holds the cam follower 98 upwardly to provide a short toasting time interval, or to its normal "Toast" position wherein it is moved below the primary control cam 102 to permit toast to be toasted according to the individual "Light—Dark" preference set by the primary control cam 102. To achieve this, an elongated slot 132 is formed in the generally vertical arm 124 of the selector lever for cooperating with a selector knob actuating pin 134. As shown more particularly in FIG. 5, both the selector lever actuating pin 134 and the selector lever actuating knob 130 are fixed to a shaft 136 which is mounted for rotation within a bearing formed in the sidewall of the toaster. A lever 140 is provided for eccentrically connecting the selector lever actuating pin 134 to shaft 136.

My unique pastry control is designed to be in one of two positions and, accordingly, suitable indicia such as "Toaster Pastries" and "Toast" may be provided on the sidewall of the toaster, and a detent construction may be provided for holding the selector lever in one or the other of these positions. Two depressions corresponding to the "Toast" and "Toaster Pastries" positions may be formed on the inside surface of the sidewall of the toaster for cooperation with a spring-urged projection 146 which is mounted on lever 140, one of the depressions is identified by reference numeral 142 in FIG. 5.

When it is desired to set the toaster for toasting toaster pastries, the selector lever actuating knob 130 is merely rotated to the "Toaster Pastries" position. During this movement, the detent projection 146 is forced out of depression 142 against the force of the spring arm 148 to which it is attached and it slides across the inside surface of the toaster sidewall until it snaps into the "Toaster Pastries" detent 142. At the same time, the selector lever actuating pin 134 slides within slot 132 to pivot the selector lever 120 about pivot 125 to thereby lift the timer cam follower 98 for setting a short pastry toasting time interval. Naturally, the friction of the parts and the projection 146 in detent recess 142 holds the timer cam follower 98 in the "Toaster Pastries" position until any number of toaster pastries have been toasted in the toaster.

When it is desired to set the toaster for toasting a slice of bread, it is merely necessary to rotate the control knob 130 to the "Toast" position. It can be appreciated that when the selector lever is moved to the "Toast" position, the insulated horizontal arm 126 is lowered below the cam follower plate 98 and the cam follower 98 being spring-urged downwardly by leaf spring 100 abuts cam 102. In this position, slices of bread may be toasted at the individual "Light—Dark" preference position which had been previously set by the primary cam member 102.

From the foregoing description, it will be appreciated that my unique, simplified electric toaster control permits an electric toaster to be temporarily set for toasting or cooking pastry-type convenience food, and yet allows the toast setting to remain in its preferred position for further use.

It can also be appreciated that my unique toaster control includes a minimum number of parts which may be readily manufactured and assembled with a bimetal-type toaster timer. The selector lever 120 may be easily stamped and conveniently pivoted for lifting the bimetal timer setting cam follower member 98. Thus, an exceedingly simple, yet sturdily constructed electric toaster control has been achieved.

I claim:

1. An electric toaster construction comprising:
   a. a toaster control for controlling a toasting cycle;
   b. a control member forming a part of and positioned on the toaster control for setting the toasting time interval of said toaster control;
   c. a primary manual setting member movable to any one of a plurality of positions to vary the setting of said control member to vary the toasting time interval, said primary setting member being normally in engagement with said control member, and said control member being movable to any one of a plurality of positions corresponding to the positions set by said primary setting member;
   d. a selector member positioned on the toaster adjacent to the control member and spaced from said primary setting member and manually movable into engagement with said control member for placing said control member under the sole and exclusive control of said selector member, said selector member including means for moving said control member away from and out of engagement with said primary setting member when the control member has been placed under the exclusive control of said selector member for changing the toasting time setting of said control member without changing the position of said primary setting member.

2. An electric toaster construction as defined in claim 1 wherein said primary manual setting member includes a slide cam member which is movable back and forth by an external control knob for varying the toasting time setting of said control member.

3. An electric toaster construction as defined in claim 1 wherein said selector member includes an L-shaped lever having a generally horizontal arm positioned below said timer member for lifting said control member to thereby set a short interval toasting time for toasting or cooking pastry-type convenience foods without disturbing the normal setting of the primary setting member.

4. An electric toaster construction as defined in claim 3 wherein said selector lever includes a generally vertical arm, and an external rotatable control knob is positioned on the toaster in operative connection with the generally vertical arm of said selector lever for moving said selector lever to control the position of said control member for setting the toasting time interval of the toaster timer.

5. An electric toaster construction as defined in claim 4 wherein a control shaft and eccentric member are positioned between said rotatable knob and said generally vertical arm for transmitting motion of said rotatable knob to said generally vertical arm.

6. An electric toaster construction comprising:
   a. a toaster timer for controlling a toasting cycle;
   b. a timer control member forming a part of and positioned on the toaster timer for setting the toasting time interval of said toaster timer;
   c. a primary manual setting member positioned on the toaster adjacent to the timer control member and movable to any one of a plurality of positions to vary the setting of said timer control member to vary the toasting time interval, said timer control member being spring biased toward said primary manual setting member and being normally spring biased into engagement with said primary setting member, said spring-biased timer control member being movable to any one of a plurality of positions corresponding to the positions set by said primary setting member; and
   d. a selector lever member positioned on the toaster adjacent to the control member and spaced from said primary setting member and manually movable into engagement with said timer control member for placing said control member under the sole and exclusive control of said selector member, said selector member including means for moving said control member away from and out of engagement with said primary setting member when the control member has been placed under the exclusive control of said selector member for changing the toasting time setting of said timer control member without changing the position of said primary setting member.

7. An electric toaster construction comprising:
   a. a toaster timer for controlling a toasting cycle, said timer including:
      1. a heat-up/cool-down bimetal having an electric resistance wire heater wound thereon; and
      2. an adjustable screw connected to one end of said bimetal;
   b. a timer setting member having one portion thereof positioned adjacent to said screw for setting the toasting time interval of said toaster timer;
   c. a slide cam member positioned adjacent to and normally in engagement with said timer setting member, for moving said timer setting member to any one of a plurality of positions for setting the toasting time interval;

d. a selector lever movable into engagement with said timer setting member for selectively overriding the slide cam member to move the timer setting member to a different toasting time position without changing the setting of the slide cam member;

e. a manually rotatable knob positioned on said toaster and operably connected to one end of said selector lever for controlling the position of said selector lever to thereby set the desired toasting time interval.